April 1, 1969  G. J. DYE  3,435,863
NUTCRACKER

Filed Feb. 21, 1967  Sheet 1 of 2

INVENTOR
Garnett J. Dye

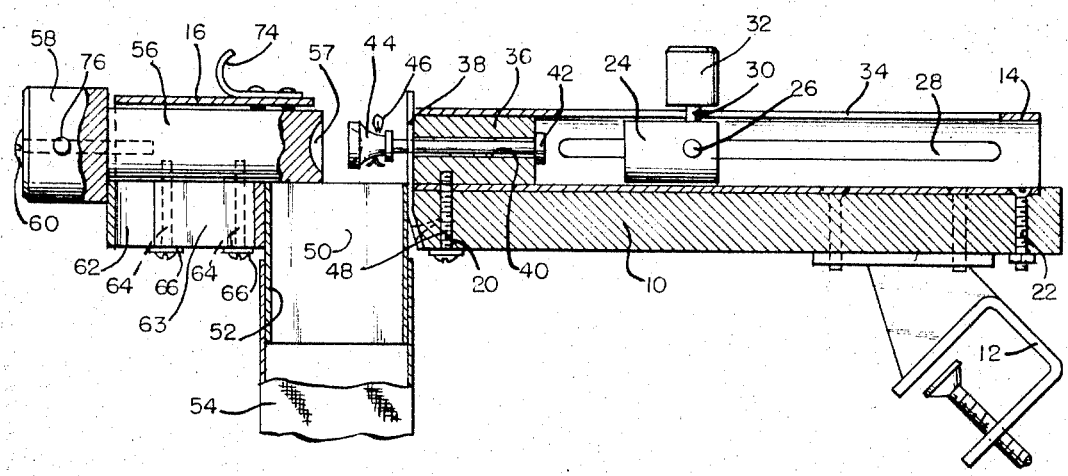
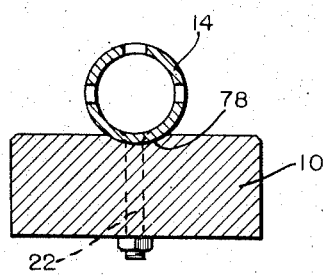
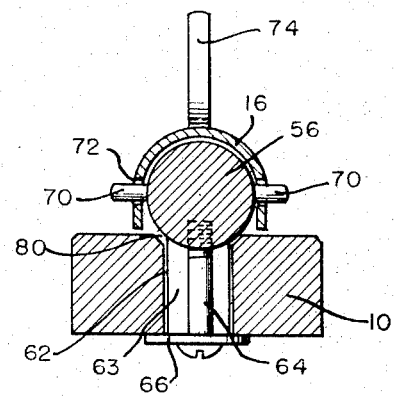

United States Patent Office 3,435,863
Patented Apr. 1, 1969

3,435,863
NUTCRACKER
Garnett J. Dye, 950 Veltre Circle SW.,
Atlanta, Ga. 30311
Filed Feb. 21, 1967, Ser. No. 617,537
Int. Cl. A47j 43/26
U.S. Cl. 146—15               2 Claims

ABSTRACT OF THE DISCLOSURE

A nutcracker having opposed cup-shaped members and an impact member for striking one of said cup-shaped members to propel same a predetermined distance toward the other cup-shaped member to shatter the shell of a pecan engaged between said members.

---

This invention relates to a novel nutcracker. Nutcrackers now known in the art will frequently crush the nut and the nut meat so that the meat *cannot be removed in one piece.*

Many of these prior art devices employ two cupped members that are relatively movable with respect to one another. Most of these devices depend upon the judgment and skill of the operator to stop the movement of the jaw members in time to avoid crushing the nut meats. This operation is quite difficult to control because the force required to crack the shell of the nut is so great that once applied manually it cannot be quickly stopped.

Some recent devices have sought to employ a limited cracking stroke, whereby the crushing stroke is arrested by a fixed stop, or where the initial movement is limited by virtue of its cam actuation.

All of these devices are limited in efficiency as the force applied by hand is limited in speed and consistency of operation. This results in partially cracked nuts if too little pressure or movement is utilized, or crushed nut meats if the pressure or movement is too great.

The present invention utilizes a high speed impact means whereby the shock received by the cupped members shatters the nut shell rather than crushing it. As a result of this shattering, the travel-limits given to the nut anvils may be restricted to safe limits, thus providing whole nut meats and shattered shells as a result of the cracking operation.

The present invention is also distinguished over the prior art by virtue of its speed of operation. Many small pecan grove owners whose scale of operation would not justify a large commercial or electronic nutcracker, have long needed a quick, efficient, and inexpensive nutcracker. With the known prior art devices the time required to crack a sufficient quantity of nuts is longer than desired. The present invention is, therefore, designed and constructed to aid the operator in shattering the nut shells in a quick and efficient manner, allowing the nut grower to shell his crop in the least amount of time possible.

It is an object of this invention to provide a nutcracker which will crack the nut and minimize breaking of the meat.

It is a further object of this invention to provide a nutcracker which will crack a quantity of nuts in a short time.

Still other objects and advantages will become apparent from the following description and the accompanying drawings, in which:

FIGURE 3 is a sectional view taken on line 3—3 of FIGURE 2.

FIGURE 4 is a section taken on line 4—4 of FIGURE 2, and

FIGURE 5 is a section taken on line 5—5 of FIGURE 2.

Figure 2:
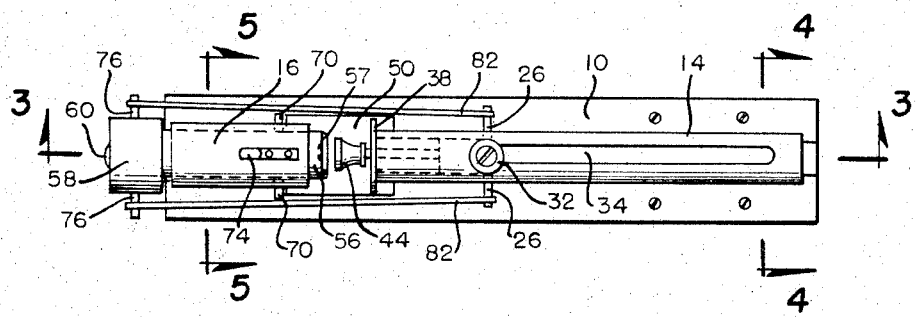
FIGURE 2 is a plan view of the nutcracker.

Referring to FIGURE 2, the nutcracker includes an elongated base member 10 composed of wood or other suitable material. The base may be provided with a screw clamp 12 so that the base can be anchored at any desired angle with respect to a table, wall or other supporting surface.

The base preferably has an opening 50 intermediate its ends and a metal liner 52 frictionally fits within the opening 50 and projects therebeneath. A fabric sleeve 54 may be fitted over the lower end of the liner 52.

Nut gripping members are mounted on said base on opposite sides of the opening 50. The first nut gripping member 57 preferably has a conical depression and is located in the inner end of the anvil member 56. The outer end 58 of anvil member 56 has a greater diameter than anvil member 56 and is provided with laterally extending projections 76. End 58 is held on anvil member by means of a screw 60. The base 10 contains a slot 62 (see FIGURES 3 and 5). Two screws 64 pass through a sliding guide member 63 and are provided with enlarged washers 66 near their rear ends and have their other ends anchored in anvil member 56 so as to permit the guide member 63 and anvil member 56 to slide a limited distance in a direction parallel to the longitudinal axis of the base member 10.

A cover member 16 of semicircular cross-section is mounted above anvil member 56. Anvil member 56 is provided with lateral projections 70 that are slidable in the slots 72 that are located in the sides of the cover 16. A handle 74 is provided on the top of cover 16. Groove 80 in base member 10 (see FIG. 4) permits better seating of anvil 56.

A second nut gripping member 44 is located on one end of an elongated shaft 40 that is slidably mounted within mounting member 36 by virtue of a bored hole passing centrally through member 36. The nut gripping member 44 is held on the end of elongated shaft 40 by a cotter pin 46. The other end of the elongated shaft 40 has an enlarged portion 42. The parts are proportioned so that the pin 40 can slide back and forth a short distance within member 36 (preferably less that about one-eighth inch).

Mounting member 36 is located at one end of a second tubular member 14 by means of a bolt 20. Tubular member 14 is fastened to the base member 10 by means of bolts 20 and 22. Wall member 38 provides a limiting abutment for the cover 16. The base member 10 is preferably grooved at 78 (see FIG. 4) so that tube 14 is slightly embedded in the base member 16.

An impact member 24 is slidably mounted within tube 14. On the sides of impact member 24 there are a pair of projections 26 which extend laterally outwardly through slots 28 located in the sides of tube 14 (see FIG. 2). Projecting from the top of impact member 24 is a stem 30 having a handle thereon. Stem 30 is slidable in slot 34 located along the upper side of tube 14.

The second nut gripping member 44 is cup-shaped and the shape of cupped member 44 is designed to grip the nut circumferentially along the shell rather than contracting the ends of the nut. In this manner the shock received by impact hammer 24 is transmitted to the midportion or sides of the shell rather than to the ends of the shell. This leaves the end portions of the shell intact with the sides shattered between the gripping portions of members 57 and 44. The shapes of these nut gripping members are machined to grip the nut circumferentially at approximately the limits of the nut kernels within the shell. The shell is therefore shattered at substantially the nut meat perimeters allowing the shell to drop free exposing the entire nut meat in one piece.

Figure 1:
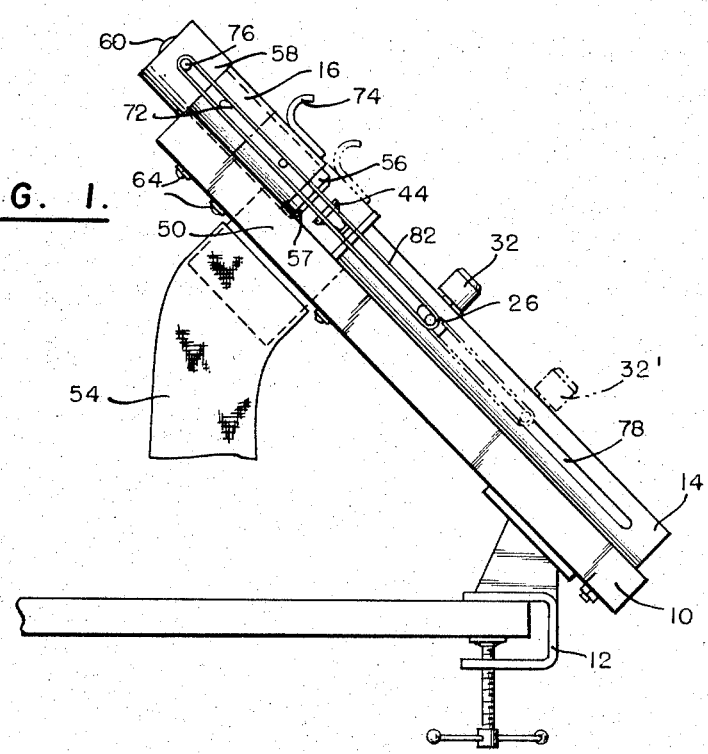
FIGURE 1 is a side elevation of the nutcracker.

To place the nutcracker in condition for operation, rubber bands 82 (see FIGS. 1 and 2) are stretched between the projections 26 on impact member 24 and the projections 76 on end portion 58 of anvil member 56. A nut, such as a pecan, is placed with one end in the nut gripping member 57 and the other end in nut gripping member 44. To accomplish this, it will be necessary to grasp handle 74 and by abutting the cover 16 against enlarged end portion 58, pull the anvil member 56 back (to the left) sufficiently to insert the nut between members 44 and 57. When the handle 74 is released, the tension applied by the rubber bands 82 holds the nut between the gripping jaws 44 and 57, and when this occurs the shaft 40 is urged to its rightmost position (so that the enlarged end portion 42 of shaft 40 extends about ⅛–¼ inch to the right of member 36). The cover 16 is then slid to the right so that it overlies the gripped nut.

The handle 32 is then pulled to the right (to the position indicated by 32') and then released, which causes impact member 24 to move rapidly to the left, until it slams against the enlargement 42. This will cause end portion 42, shaft 40 and nut gripping means 44 to move to the left with a forceful blow. Since anvil parts 56, 58 are quite heavy and have considerable inertia, they will not yield before the nut fractures. The nut gripping member 57 may then be retracted by pulling handle 74 to the left and the shattered nut will be released and will drop through opening 52 and tube 54 and into a container.

It is readily apparent that some sort of coiled spring arrangement could be used in place of the rubber bands 82 which I have described and shown in the drawings without altering the inventive concept.

It would also be obvious to one skilled in the art that the impact member 24 could be powered by means of an electric solenoid or by pneumatic pressure.

The advantages are:

(1) Due to the high velocity of the impact member (or hammer member) the shell shatters, rather than just cracks.

(2) Due to the cupped shape of the two nut gripping members that press against the nut, the impact force is primarily applied to the sides of the shell rather than the ends, so that the sides shatter. An examination of some cracked nuts has revealed that generally the ends of the shell come off intact while the sides are shattered. Frequently 25% of the shattered nuts require no further effort.

(3) The impact stroke that slams against the nut only travels about one-eighth inch. This avoids crushing of the nut.

(4) The speed of operation is much greater than any hand nut cracker, and can easily be mastered by using the following procedure. (1) Work the upper slide and cover with the left hand, and while keeping the left hand in place, (2) pick up a nut with the right hand, insert it, pull back the striker with the right hand, (3) pick up a new nut with the right hand as the cracked nut is expelled by pulling up the slide with the left hand and made ready (or cleared) to receive a new nut, which is put into place with the right hand.

(5) By putting a bowl under the chute to catch the cracked nuts and due to the protection afforded by the sliding cover, very few shell particles are scattered.

While I have shown and described a preferred form of my invention, it is obvious that variations in details of form may be made without departing from the invention as defined in the appended claims.

What is claimed is:

1. A nutcracker, comprising:
 (a) an elongated base, said base having an opening located intermediate its ends,
 (b) an anvil member mounted on said base on one side of said opening,
 (c) a tubular member mounted on the other side of said base and coaxially aligned with said anvil member,
 (d) an impact member mounted within said tubular member and axially movable therein,
 (e) an axially movable cupped member mounted within said tubular member and between said anvil and said impact member,
 (f) resilient means interconnecting said impact member against said cupped member, whereby a nut placed between said cupped member and said anvil is shattered when said cupped member is struck by said impact member.

2. A nutcracker, comprising:
 (a) a base,
 (b) opposed nut gripping jaw members mounted on said base,
 (c) each of said opposed nut gripping jaw members being axially movable both with respect to each other and with respect to the base,
 (d) an impact member mounted on said base,
 (e) a guide member for said impact member which limits the movement of said impact member to a path which is in alignment with the axis of said opposed nut gripping jaw members,
 (f) abutment means for limiting the length of travel of the nut gripping jaw member that is to be struck by said impact member to a distance not greater than about one-eighth inch,
 (g) the nut gripping jaw member that is not adapted to be struck by said impact member being axially movable relative to said base for a distance greater than one-quarter inch so as to facilitate the insertion of a nut between said jaw members,
 (h) means for applying sudden force to said impact member, whereby said impact member will suddenly and sharply strike against the first of said opposed nut gripping jaw members, moving it a distance not to exceed about one-eighth inch and shattering the shell of the nut held between said opposed nut gripping jaw members.

References Cited

UNITED STATES PATENTS

| 2,142,769 | 1/1939 | Walthers | 146—15 |
| 3,127,917 | 4/1964 | Turner | 146—15 |
| 3,159,194 | 12/1964 | Anderson | 146—16 |

W. GRAYDON ABERCROMBIE, *Primary Examiner.*

U.S. Cl. X.R.

74—70; 146—131